United States Patent [19]
Pazik

[11] Patent Number: 5,850,933
[45] Date of Patent: Dec. 22, 1998

[54] MOLDED GAS TANK WITH INTERNAL BAFFLE

[76] Inventor: John A. Pazik, Rte. 1, Box 152, Clearwater, Minn. 55320

[21] Appl. No.: 81,858

[22] Filed: Jun. 22, 1993

Related U.S. Application Data

[63] Continuation of Ser. No. 761,714, Sep. 17, 1991, abandoned.

[51] Int. Cl.⁶ .................................................. B65D 11/22
[52] U.S. Cl. ......................................... 220/563; 220/4.14
[58] Field of Search ..................................... 220/675, 562, 220/563, 564, 4.13, 4.14, 414; 73/305, 317

[56] References Cited

U.S. PATENT DOCUMENTS

| | | | |
|---|---|---|---|
| 3,595,422 | 7/1971 | Durrett, Jr. et al. | 220/4.14 |
| 3,794,203 | 2/1974 | Baumann | 220/4.14 |
| 3,912,107 | 10/1975 | Baumann | 220/4.14 X |
| 4,231,482 | 11/1980 | Bogan | 220/675 X |
| 4,526,286 | 7/1985 | Jüng et al. | 220/4.14 X |
| 4,821,908 | 4/1989 | Yost | 220/86.2 |
| 4,928,526 | 5/1990 | Weaver | 73/317 X |

OTHER PUBLICATIONS

Solar Plastics brochure of Jul. 1986.
Advertisement for LTL Tank.
Photograph showing Prior Art Tank of Tanks, Inc.
Solar Plastics, Jul. 1986.
LTL Tank advertisement.
Prior Art Tank of Tanks, Inc.

*Primary Examiner*—Steven Pollard
*Attorney, Agent, or Firm*—James W. Miller

[57] ABSTRACT

A vehicle fuel tank is made from a plastic molding process in which various models of the tank are required with differently oriented fuel filler necks. One of the mold halves for the tank is provided with a mold insert over that portion of the mold half which forms the fuel filler neck. Different mold inserts are provided each one of which provides a differently oriented version of the fuel filler neck. Different models of the tank are molded with different mold inserts in place such that each tank has an integrally molded fuel filler neck oriented in the proper manner. In addition, a through pocket is integrally molded into the tank between the sides of the tank to form a transverse baffle for preventing fuel from sloshing from one side of the tank to the other.

15 Claims, 1 Drawing Sheet

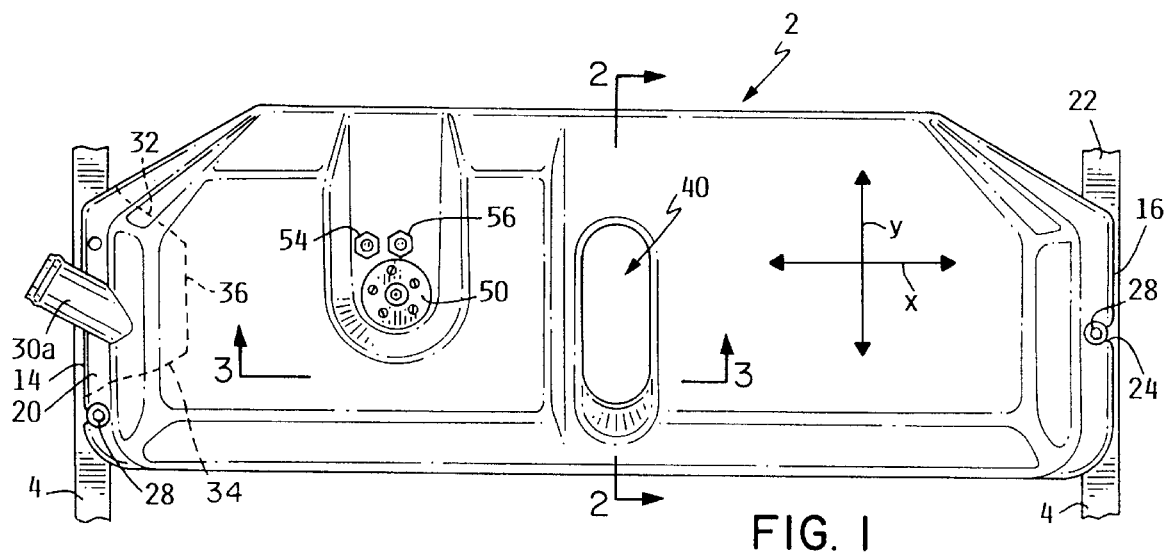
FIG. 1
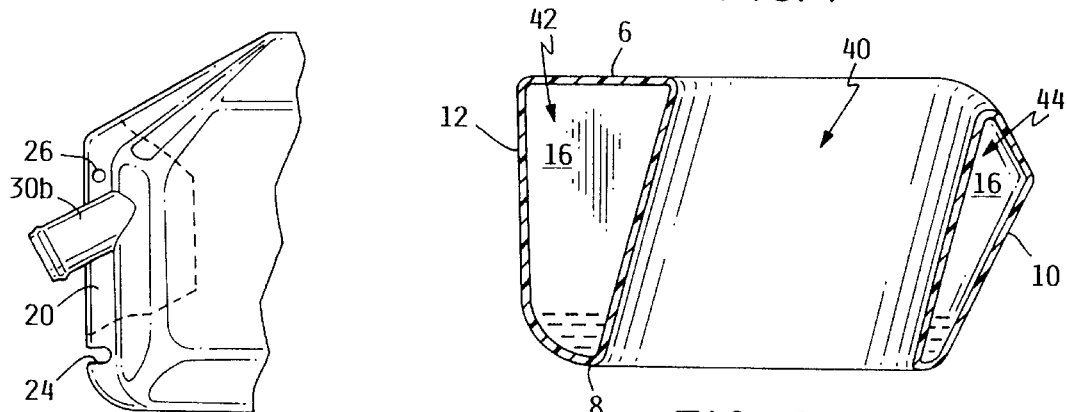
FIG. 4
FIG. 2
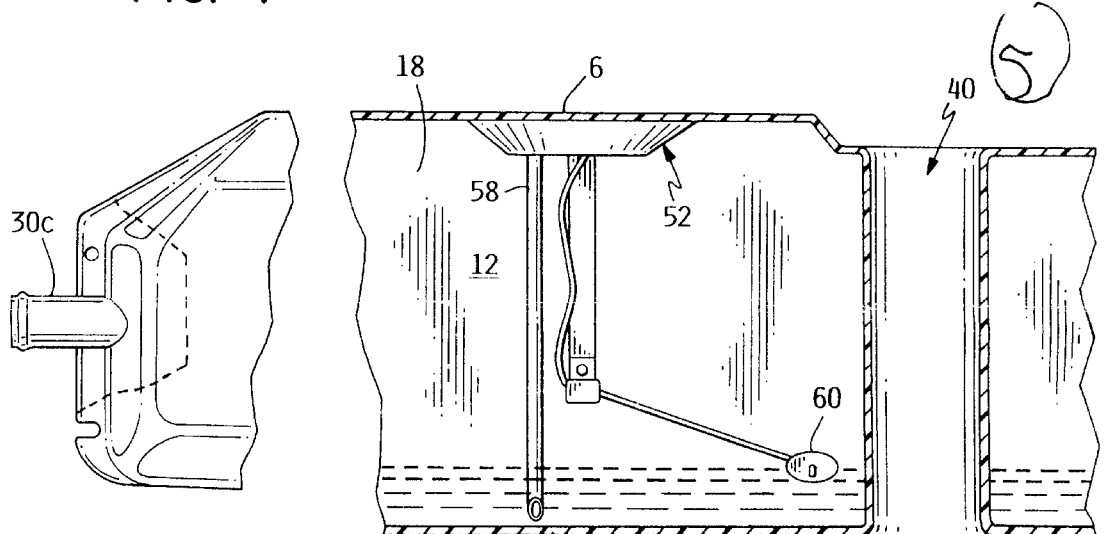
FIG. 5
FIG. 3

MOLDED GAS TANK WITH INTERNAL BAFFLE

This application is a continuation of application Ser. No. 07/761,714, filed on Sep. 17, 1991, now abandoned.

TECHNICAL FIELD

The present invention relates to a method of manufacturing a fuel tank for a vehicle in which various models of the tank have fuel filler tubes oriented at different angles relative to the longitudinal axis of the tank and to a tank made from such method. In addition, the present invention relates to a molded, plastic fuel tank having a transverse baffle molded therein between opposite sides of the tank.

BACKGROUND OF THE INVENTION

Various older model Ford automobiles (1935–1940 vintage) had rectangular fuel tanks supported between two support beams on the vehicle frame. The original equipment Ford tanks were made of metal parts welded together. Each side of the tank had a peripheral attachment flange designed to rest on top of the support beams. The tank was bolted to the support beams by a plurality of bolts extending down through various holes in the attachment flanges to secure the tank in place.

The fuel tanks for the various model years of automobiles referred to above were generally identical except for the fuel filler neck provided in the top portion of the tank. While the neck in each tank comprised a generally cylindrical tube, the neck was angled differently relative to the tank for automobiles of different model years. For the 1935–36 Ford automobiles, the neck was angled rearwardly relative to the longitudinal axis of the tank, in the 1937 model the neck was angled forwardly from the longitudinal tank axis, and in the 1938–40 Ford vehicles the neck was generally aligned with, i.e. was parallel to, the longitudinal axis of the tank.

In the original equipment tanks manufactured by Ford, the fuel filler neck for the various tanks was a separate metal piece individually welded to the tank body. Thus, each tank was basically individually manufactured with the fuel filler neck being appropriately oriented on the tank body for that version of the tank then being manufactured. The neck would be welded in place after it was properly aligned.

It is now largely impossible to obtain original equipment tanks for these Ford automobiles, which are now "antique" or "classic" cars, or for the more modern reproductions of these automobiles known as "street rods". However, reproduction fuel tanks are built by various companies to fit such cars.

One such tank for these vehicles, manufactured by LTL Industries Ltd., is molded from plastic with a common tank body similar to the body of the original equipment or stock tank. However, the LTL tank is molded to have only one fuel filler neck configuration, i.e. the configuration for the 1938–40 model year vehicle in which the neck parallels the longitudinal tank axis. This is the only tank built by LTL for the automobiles from all the different model years including those in which the filler necks were angled either forwardly or rearwardly on the tank body. To make the LTL tank fit these other automobiles, it is necessary to buy elbows, hoses and/or fittings and individually plumb the filler neck to fit to or connect to the gasoline inlet.

The known methods of making the various fuel tanks of the type noted have their disadvantages. The original Ford manufacturing method of forming numerous metallic pieces for the tank and welding them all together is very labor intensive. Accordingly, it yields a tank which is quite expensive to manufacture and sell given modern labor rates. The molded LTL tank is somewhat less labor intensive and more economical to manufacture, but it does not provide fuel filler necks which are appropriately oriented for each automobile model which uses the tank. The need to individually plumb the one neck configuration which is provided to fit to the various disparate model years is annoying and entails additional labor when installing the tank. In addition, the fittings used are more prone to leaking due to the various bends involved, and thus may be somewhat more hazardous.

In addition, it is desirable for elongated, rectangular tanks of the type used in these vehicles to have a transverse baffle placed between their opposed sides. This prevents fuel from sloshing form one side of the tank to the other during turns to ensure more reliable fuel pick up and to decrease the undesirable noise such sloshing causes. In the original equipment Ford tanks, such baffles could be easily provided during tank manufacture by cutting a baffle to size and welding it in place during manufacture of the tank before the top and bottom pieces of the tank were secured to one another. However, such a method is not practical for a molded plastic tank. For example, the LTL tanks made for these automobiles are simply provided without a baffle.

The Applicant herein has previously made and sold a plastic tank which is prior art to the present invention, albeit a tank which is not intended for use with the specific automobiles noted above. This tank is rectangular and has a transverse pocket molded in the top thereof which pocket extends part of the way down through the tank, i.e. approximately about half the way to the bottom of the tank. This pocket forms, in effect, a partial transverse baffle in the upper half of the tank.

This tank is also provided with a metallic baffle in the lower half of the tank which metallic baffle is longitudinally spaced from the transverse pocket. This metallic baffle is welded to and supported by a horizontal plate on the top of the tank which plate carries various fittings for some of the tank components such as the fuel sender unit. The metallic baffle is connected to the plate by a vertical connecting plate welded at one end to the horizontal plate and at the other end to the metallic baffle. Both the metallic baffle and the molded pocket are required to adequately baffle the tank and keep fuel from sloshing from one end of the tank to the other.

While the Applicant's prior tank had at least part of the necessary baffle structure integrally molded into the tank, it still used a metallic baffle that was welded to a metallic support plate to complete the baffle structure. Thus, even his own prior tank was subject to some of the disadvantages noted for the prior Ford tank, i.e. the need to provide separate metallic baffles (and the other metallic components to which the baffle could be welded) along with the labor required in assembling and installing the metallic baffle in the tank.

BRIEF DESCRIPTION OF THE DRAWINGS

The present invention will be described hereafter in the Detailed Description, taken in conjunction with the following drawings, in which like reference numerals refer to like elements or parts throughout.

FIG. 1 is a top plan view of a fuel tank according to the present invention, particularly illustrating a first embodiment of the tank having a first orientation for the fuel filler neck;

FIG. 2 is a cross-sectional view taken along lines 2—2 in FIG. 1, particularly illustrating the transverse baffle defining pocket molded into the tank;

FIG. 3 is a cross-sectional view taken along lines 3—3 in FIG. 2, again particularly illustrating the transverse baffle defining pocket and the float mechanism of the fuel sender unit positioned adjacent one wall of the pocket;

FIG. 4 is a top plan view of a fuel tank according to the present invention, particularly illustrating a second embodiment of the tank having a second orientation for the fuel filler neck; and FIG. 5 is a top plan view of a fuel tank according to the present invention, particularly illustrating a third embodiment of the tank having a third orientation for the fuel filler neck;

DETAILED DESCRIPTION

A fuel tank according to the present invention is illustrated in FIG. 1 as 2. Fuel tank 2 is generally rectangular having a length suited to allow the tank to slip or fit between two support beams 4 on the frame of the automobile. Tank 2 has opposed top and bottom walls 6 and 8 connected by opposed front and rear walls 10 and 12 and opposed left and right side walls 14 and 16 to form an interior, hollow cavity 18 for receiving fuel. See FIGS. 1 and 2. Thus, fuel tank 2 has a longitudinal axis denoted as x. In addition, fuel tank 2 has a width about a transverse axis denoted as y. See FIG. 1.

Fuel tank 2 is provided on both the left and right sides with a peripheral, outwardly extending attachment flange 20 and 22, respectively. Attachment flanges 20 and 22 are placed near the top of the tank and are shaped on tank 2 to overlie and rest against support beams 4 when tank 2 is placed between the support beams. The right side flange 22 is provided with a single straight sided, open ended slot 24 that faces to the side away from tank 2. The left side attachment flange 20 is provided with a similar slot 24 and, in addition, an enclosed generally circular hole 26. Bolts 28 are suited to be received both in the slots 24 and through the hole 26 for bolting tank 2 to support beams 4 on the vehicle frame in a known manner. The fact that one of the attachment members in the right side flange 22 is a hole 26 instead of a slot 24 will be discussed more fully below.

Tank 2 is preferably molded from plastic using any suitable plastic molding process, such as rotational molding. In this molding method, two mold halves (not shown), i.e. an upper mold half and a lower mold half, come together to form tank 2. These mold halves preferably meet at approximately the level of the attachment flanges 20 and 22 to form different portions of tank 2. Actually, the parting line between the upper and lower mold halves would bisect the thickness of the attachment flanges 20 and 22. Thus, the upper mold half would form the top portion of tank 2 while the lower mold half would form the lower portion of tank 2 beneath the level of the attachment flanges. These portions are unequal in depth, i.e. the upper portion is substantially shorter than the lower portion, since attachment flanges 20 and 22 are relatively close to the top of tank 2. Thus, the term mold halves is not meant to refer to mold parts that form equal sized portions of the tank, but only to the fact that both mold halves have to come together to form a complete tank 2.

Tank 2 includes a fuel filler neck 30 in the form of a cylindrical tube. Neck 30 is contained in the top portion of tank 2 near the left side of the tank and extends out past the left side of the tank.

Neck 30 is preferably integrally molded as part of tank 2 to form an integral portion thereof. In this regard, the upper mold half is cut away over the area indicated by the dotted lines in FIG. 1. A mold insert (not shown) is inserted into that cut away portion of the upper mold half to complete the upper mold half. The dotted lines in FIG. 1 illustrate the parting lines which are visibly left on tank 2 after the molding process is complete, which parting lines thus illustrate the size and shape of the mold insert. The parting lines left on tank 2 are only on the top wall 6 of tank 2 and do not extend downwardly through the top wall.

Thus, as shown in FIG. 1, the mold insert includes a forward parting line 32, a rearward parting line 34 and a transverse inner parting line 36 connecting the inner ends of the forward and rearward parting lines 32 and 34. The forward and rearward parting lines 32 and 34 extend all the way out to the side of tank 2 such that the mold insert also extends over that portion of the left side attachment flange 20 which has the enclosed circular attachment hole 26. The slot 24 in that attachment flange 20 is not located in the mold insert, but in the remaining portion of the upper mold half.

Referring to FIGS. 1, 4 and 5, different models of fuel tank 2 are required having differently oriented fuel filler necks 30. In FIG. 1, fuel filler neck 30a is forwardly angled relative to longitudinal axis x of tank 2 to fit a 1937 model Ford automobile. In FIG. 4, fuel filler neck 30b is angled rearwardly relative to longitudinal axis x to fit various 1935–36 Ford cars. Finally, as shown in FIG. 5, some tanks 2 desirably have the fuel filler neck 30c oriented parallel to or aligned with longitudinal axis x to fit 1938–1940 Ford automobiles.

Accordingly, to form the various fuel filler necks 30a–c which are required, three different mold inserts will be provided having suitable mold structure for forming the different necks. One insert will have the mold structure needed for forming the neck 30a of FIG. 1 with the neck forming portions of the mold insert being parallel to the forward parting line 32 of the mold insert. Similarly, another insert will have the mold structure needed for forming the neck 30b of FIG. 4 with the neck forming portions of the mold insert being parallel to the rearward parting line 34 of the mold insert. Finally, a third insert will have the mold structure needed for forming the neck 30c of FIG. 5 with the neck forming portions of the mold insert sticking out straight to the side to be parallel to the longitudinal axis x of tank 2.

In manufacturing the various models of tank 2 which are required, only one mold insert at a time is used in the cut away portion of the upper mold half. A pin (not shown) is inserted through this mold insert in a position such that the pin will form the enclosed hole 26 in attachment flange 20 when tank 2 is molded. The mold halves are then brought together and the plastic material injected into the mold halves. The molding process then proceeds in the well known manner customary for rotational molding to form a complete and integral plastic tank 2.

In releasing tank 2 from the mold halves, the pin which forms hole 26 is first pulled out of the mold insert to free the mold insert from tank 2. The mold insert is then pulled to the side in a direction which is parallel to the fuel filler neck 30 which has just been formed by the insert. In other words, if the FIG. 5 neck 30c has just been formed, the mold insert is pulled straight to the side parallel to x axis of the tank. If the FIG. 1 neck 30a has just been molded, the mold insert is pulled forwardly to the side at an angle parallel to the forward parting line 32. Similarly, for the FIG. 4 neck 30b, the mold insert is pulled at an angle to the side which is parallel to the rearward parting line 34. This allows the mold insert to slip off the neck 30 without destroying the neck. Once the mold insert is removed from the upper mold half, the upper and lower mold halves can then be pulled apart and the finished molded tank 2 removed from the mold halves.

The advantage of the present invention is that tank 2 can be easily manufactured in different versions such that each finished tank 2 has an integrally molded fuel filler neck 30 which is appropriately configured and does not require extensive additional plumbing when installing tank 2 in the appropriate model Ford automobile. In other words, someone desiring to have a tank for a 1938–40 automobile can buy one in which the integrally molded neck 30c extends out to the side exactly in the same orientation as the neck in the original equipment Ford tank. Similarly, a tank for a 1937 car will have the neck 30a extending forwardly at the appropriate angle of the stock tank and the tank for the 1935–36 vehicle will also extend rearwardly at just the right angle. However, these precisely configured necks are provided in plastic molded tanks 2 which are economical to manufacture and purchase.

The use of a hole 26 is preferred for that portion of the attachment flange 20 formed by the mold insert rather than using a slot 24. If a slot 24 were used there, then the sides of the slot would have to be parallel to the forward and rearward parting lines 32 and 34 of the mold insert to allow the mold insert to be pulled off when forming necks 30a and 30b. However, such a slot 24 with widely angled sides would probably not provide a sufficient bearing surface for the head of bolt 28. Thus, it is preferred to form a circular hole 26 in attachment flange 20, using a pin placed in the mold insert at the appropriate point, to ensure attachment bolt 28 will sufficiently clamp tank 2 in place at that point. However, it is preferred to use open ended slots 24 at the other attachment locations on flanges 20 and 22 to accommodate the usual slight variations in the length of tank 2 which result from a rotational plastic molding process. This eases installation of tank 2 by not requiring slots 24 to be as precisely located on flanges 20 and 22.

Another feature of tank 2 according to the present invention is the use of a transverse, rectangular pocket 40 in tank 2 extending completely through tank 2 between the top and bottom surfaces 6 and 8 of tank 2. Pocket 40 is formed by portions of the upper and lower mold halves which come together in the mold to prevent any plastic material from being present in the volume to be occupied by pocket 40. Pocket 40 does not extend all the way across the width of tank 2 in the direction of the y axis, but does extend a substantial distance thereacross, more than 50%. Thus, as shown in FIG. 2, tank 2 has a rearward connecting portion 42 behind pocket 40 and a small forward connecting portion 44 in front of pocket 40. This allows fuel to flow from one side of tank 2 to the other through the forward and rearward connecting portions 42 and 44, but obviously not through pocket 40.

Pocket 40 forms, in effect, an integral baffle in tank 2. It allows fuel to flow form one side of the tank to the other for pick up, but prevents sloshing of the fuel in tank 2. The baffle formed by pocket 40 is provided simply as part of the molding process. No separate baffle plate or installation steps for mounting a baffle plate within tank 2 are required. Thus, tank 2 is still inexpensive to manufacture, but provides the advantages of a tank having an internal baffle located between opposite sides thereof.

Desirably, top surface of tank 2 also includes an opening to which the mounting plate 50 of a fuel sender unit 52, i.e. part of the gas gauge mechanism, can be bolted, and molded inserts 54 and 56 for mounting a fuel pick up tube 58 and a tank vent (not shown). The fuel sender unit 52 has a float 60 that senses the level of fuel in tank 2. Float 60 is desirably located closely adjacent one side wall of pocket 40 as shown in FIG. 3. This allows fuel sender unit to more accurately sense the fuel level within tank 2 unaffected by fuel movement within the tank. The fuel sender unit 52, fuel pick up tube 58 and the vent are all conventional devices well known in the art.

The method of manufacturing tank 2 according to the present invention has many advantages. It provides an economical way for manufacturing a variety of tanks having differently oriented fuel filler necks 30, and for providing a transverse baffle for preventing sloshing of fuel from one side of the tank to the other. Accordingly, it is more economical to manufacture and purchase, and easier to install, than known prior art tanks.

Various modifications of this invention will be apparent to those skilled in the art. For example, the baffle forming through pocket 40 can be used in molded fuel tanks which have other types of fuel filler necks and thus pocket 40 is not limited for use with tank 2 as shown herein. In addition, the concept of using multiple mold inserts in a single mold half for forming differently oriented fuel filler necks is not limited for use with fuel tanks made for just Ford automobiles, but would have application to fuel tanks made for other brands of vehicles, such as Chevrolet and the like. Thus, the scope of the present invention is to be limited only by the appended claims.

I claim:

1. A generally rectangular fuel tank for a vehicle, which comprises:

a tank having a predetermined length along a longitudinal axis and a predetermined width along a transverse axis, the length of the tank being longer than its width, the tank having opposed top and bottom walls connected by opposed front and rear walls and opposed left and right side walls to form an interior, hollow cavity for receiving fuel;

wherein the tank includes means for mounting the tank in the vehicle such that the longitudinal axis of the tank is disposed transverse to a forward direction of motion of the vehicle such that fuel carried in the tank will slosh between the left and right side walls of the tank during turns of the vehicle;

wherein the tank is integrally molded out of a plastic material;

wherein the tank is provided with a single, integrally molded pocket that extends through the depth of the tank between the top and bottom walls of the tank, the pocket being generally at right angles to the longitudinal axis of the tank and positioned approximately midway between the left and right sides of the tank such that the pocket forms a transverse baffle in the tank between the left and right side walls thereof extending all the way between the top and the bottom walls of the tanks, whereby the pocket minimizes sloshing of the fuel between the left and right side walls of the tank during turns of the vehicle; and wherein the interior hollow, cavity of the tank is otherwise unobstructed by any other baffle forming walls except for the walls forming the single, integrally molded pocket to maximize the fuel receiving volume of the cavity and promote fuel flow within the cavity to a fuel pick up tube received in the cavity.

2. A fuel tank as recited in claim 1, wherein the pocket is rectangular in shape and extends over more than 50% of the transverse width of the tank.

3. A fuel tank as recited in claim 2, wherein the left and right sides of the tank are provided with integrally molded attachment flanges which extend outwardly therefrom, wherein the attachment flanges include openings for allowing fasteners to pass therethrough and secure the tank to two spaced support beams on the vehicle.

4. A fuel tank as recited in claim 3, wherein the tank further includes an integrally molded fuel filler neck which extends outwardly from the tank and overlies one of the attachment flanges.

5. A fuel tank as recited in claim 4, wherein the opening on the attachment flange which is closest to the fuel filler neck comprises a circular hole, and wherein all of the other openings on the attachment flanges comprise slots that are open-ended and face away from the tank.

6. A fuel tank as recited in claim 5, wherein the circular hole and slots are integrally molded into the attachment flanges as part thereof.

7. A fuel tank as recited in claim 1, wherein the tank further includes a fuel sender means for sensing and reporting the level of fuel in the tank, wherein the fuel sender means includes a vertically movable float that floats on top of the fuel contained in the tank, wherein the float has a pre-determined width and is arranged to be closely adjacent but spaced from one side wall of the pocket by a distance which is approximately equal to or less than the width of the float as it moves vertically up and down, whereby the pocket protects the float and allows the float to be less affected by the movement of fuel within the tank.

8. A fuel tank as recited in claim 1, wherein the tank further includes a fuel sender means for sensing and reporting the level of fuel in the tank, wherein the fuel sender means includes a vertically movable float that floats on top of the fuel contained in the tank, wherein the float is pivotally connected to the fuel sender means by a pivotal support arm with the float being carried on an outer end of the support arm, wherein the pivot point for the pivotal support arm is located between the top and bottom walls of the tank, and wherein the pivotal support arm of the fuel sender means extends from the fuel sender means towards the one side wall of the pocket such that the float is located proximate to the one side wall and on the same side of the one side wall as the pivot point for the support arm and remains substantially proximate to the one side wall as the pivotal support arm pivots up and down, the float being spaced from the one side wall by a distance which is substantially less than the length of the support arm.

9. A fuel tank as recited in claim 1, wherein the fuel pick up tube extends into the tank and terminates adjacent the bottom wall of the tank for allowing fuel to enter the pick up tube to exit the tank, wherein the fuel pick up tube terminates approximately midway between the pocket and one of the side walls of the tank to effectively drain the tank of fuel.

10. A fuel tank for a vehicle, which comprises:

a tank having a predetermined length along a longitudinal axis and a predetermined width along a transverse axis, the tank having opposed top and bottom walls connected by a first set of opposed front and rear walls and a second set of opposed left and right side walls to form an interior, hollow cavity for receiving fuel;

wherein the tank includes means for mounting the tank in the vehicle such that one axis of the tank is disposed transverse to a forward direction of motion of the vehicle such that fuel carried in the tank will slosh between one set of the opposed walls of the tank during turns of the vehicle;

wherein the tank is provided with a baffle that is arranged at right angles to the one axis of the tank and is positioned between the opposed walls in the one set thereof, the baffle extending all the way between the top and the bottom walls of the tank, whereby the baffle minimizes sloshing of the fuel between the opposed walls of the one set thereof during turns of the vehicle; and fuel sender means for sensing and reporting the level of fuel in the tank, wherein the fuel sender means includes a vertically movable float that floats on top of the fuel contained in the tank, wherein the float has a pre-determined width and is arranged to be closely adjacent but spaced from one side of the baffle by a distance which is approximately equal to or less than the width of the float as it moves vertically up and down, whereby the baffle protects the float and allows the float to be less affected by the movement of fuel within the tank between the opposed walls of the one set thereof.

11. A fuel tank as recited in claim 10, wherein the tank is integrally molded out of a plastic material, and wherein the tank is provided with an integrally molded pocket that extends through the depth of the tank between the top and bottom walls of the tank, the pocket forming the baffle.

12. A fuel tank as recited in claim 10, wherein the float is pivotally connected to the fuel sender means by a pivotal support arm with the float being carried on an outer end of the support arm, wherein the pivot point for the pivotal support arm is located between the top and bottom walls of the tank, and wherein the pivotal support arm of the fuel sender means extends from the fuel sender means towards the one side of the baffle such that the float is located proximate to the one side of the baffle and remains substantially proximate to the one side of the baffle as the pivotal support arm pivots up and down.

13. A fuel tank as recited in claim 12, further including a fuel pick up tube extending into the tank and terminating adjacent the bottom wall of the tank for allowing fuel to enter the pick up tube to exit the tank, wherein the fuel pick up tube terminates approximately midway between the baffle and one of the walls in the one set of opposed walls to effectively drain the tank of fuel.

14. A fuel tank as recited in claim 11, wherein the tank mounting means is provided only adjacent the left and right side walls of the tank such that a middle portion of the tank is unsupported.

15. A fuel tank for a vehicle, which comprises:

a tank having a predetermined length along a longitudinal axis and a predetermined width along a transverse axis, the tank having opposed top and bottom walls connected by a first set of opposed front and rear walls and a second set of opposed left and right side walls to form an interior, hollow cavity for receiving fuel;

wherein the tank includes means for mounting the tank in the vehicle such that one axis of the tank is disposed transverse to a forward direction of motion of the vehicle such that fuel carried in the tank will slosh between one set of the opposed walls of the tank during turns of the vehicle;

wherein the tank is provided with a baffle that is arranged at right angles to the one axis of the tank and is positioned between the opposed walls in the one set thereof, the baffle extending all the way between the top and the bottom walls of the tank, whereby the baffle minimizes sloshing of the fuel between the opposed walls of the one set thereof during turns of the vehicle; and fuel sender means for sensing and reporting the level of fuel in the tank, wherein the fuel sender means includes a vertically movable float that floats on top of the fuel contained in the tank, wherein the float is pivotally connected to the fuel sender means by a pivotal support arm with the float being carried on an outer end of the support arm, wherein the pivot point for the pivotal support arm is located between the top and bottom walls of the tank, and wherein the pivotal support arm of the fuel sender means extends from the fuel sender means towards the one side wall of the pocket such that the float is located proximate to the one side wall on the same side of the one side wall as the pivot point for the support arm and remains substantially proximate to the one side wall as the pivotal support arm pivots up and down, the float being spaced from the one side wall by a distance which is substantially less than the length of the support arm.

* * * * *